Figure 1:
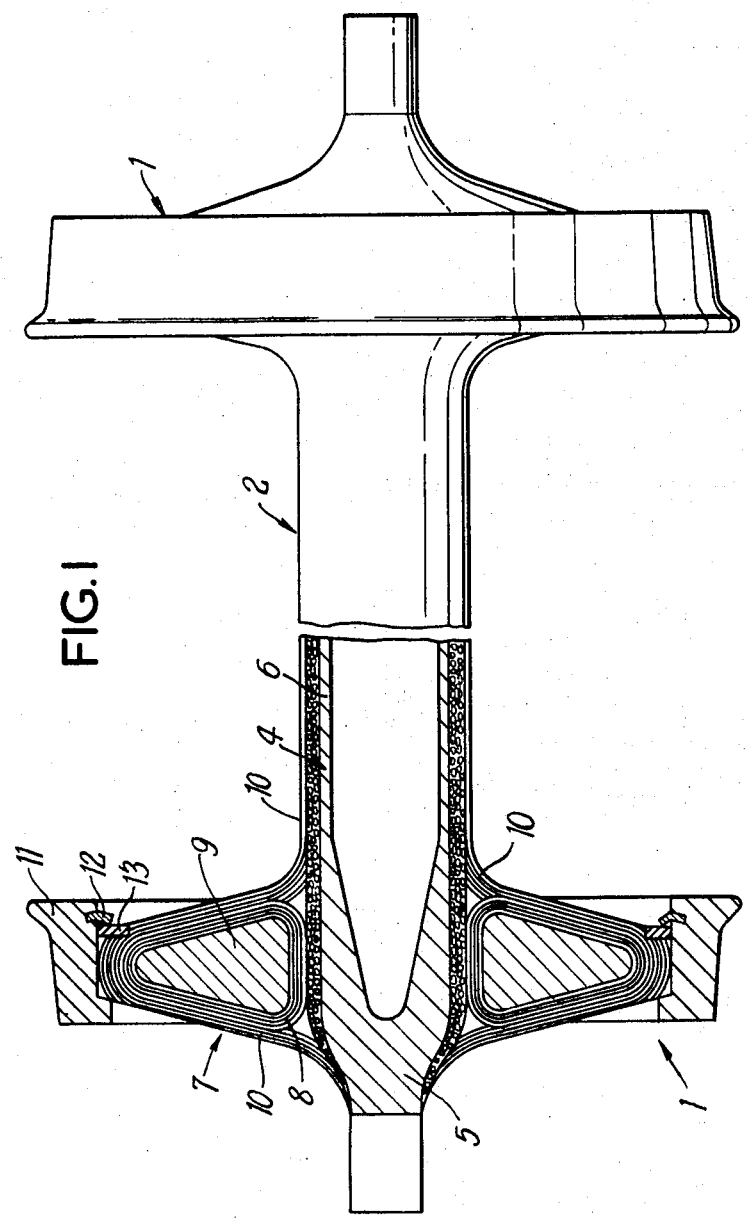

United States Patent
Gimlett et al.

[11] 3,756,646
[45] Sept. 4, 1973

[54] RAILWAY WHEEL AND AXLE ASSEMBLY

[75] Inventors: Gilbert Donald Gimlett; Brian James Hawthorne, both of Derby, England

[73] Assignee: British Railways Board, London, England

[22] Filed: Jan. 19, 1971

[21] Appl. No.: 107,747

[30] Foreign Application Priority Data
Jan. 26, 1970 Great Britain...................... 3,597/70
Oct. 7, 1970 Great Britain.................. 47,705/70

[52] U.S. Cl.......................... 295/43, 295/7, 295/15, 295/18, 295/21, 295/37
[51] Int. Cl... B60b 17/00, B60b 35/12, B60b 37/06
[58] Field of Search ...................... 295/7, 8, 15, 18, 295/21, 23, 30, 36 R, 36 A, 37, 43

[56] References Cited
UNITED STATES PATENTS

| | | | |
|---|---|---|---|
| 1,357,226 | 11/1920 | Davis | 295/36 R |
| 2,747,918 | 5/1956 | Blackwood | 295/36 R |
| 239,991 | 4/1881 | Smith | 295/21 |
| 155,433 | 9/1874 | Durfee | 295/21 |
| 1,122,620 | 12/1914 | Madden | 295/21 X |
| 2,001,167 | 5/1935 | Swennes | 295/36 X |

*Primary Examiner*—Robert G. Sheridan
*Assistant Examiner*—Howard Beltran
*Attorney*—Sommers & Young

[57] ABSTRACT

This invention relates to a wheelset, that is a pair of railway wheels having tires fixedly connected by fibrous resin bonding materials to an axle so that they rotate with the axle.

According to the invention the axle is formed by applying a resin-bonded fibrous material comprising one of, or any combination of carbon, boron, asbestos and glass fibers to an axle core, the wheels having wheel centers secured to the axle by a continuation of the fibrous material extending from the axle on to each wheel center so that the wheels and axle are an integral assembly.

The wheelset is particularly applicable to railway vehicles.

8 Claims, 2 Drawing Figures

RAILWAY WHEEL AND AXLE ASSEMBLY

This invention relates to wheels and wheelsets, particularly but not exclusively for railway vehicles. By the term wheelset is meant a pair of wheels fixedly connected to an axle so that they rotate with the axle.

According to the present invention there is provided a wheelset comprising a pair of wheels and an axle, the axle being formed at least in part by a fibrous resin bonded material applied to an axle core, the wheels having wheel centers secured to the axle by a continuation of said fibrous material extending from the axle on to each wheel center so that the wheels and axle are an integral assembly.

The wheel centers may each have at least one projecting sleeve portion, the continuation of the fibrous material extending over the sleeve portions to form the integral assembly. Each wheel center may comprise two substantially annular sections secured coaxially together, in which case, each section may have a projecting sleeve portion, the fibrous material being laid around both the sleeve portions of each section.

Alternatively, the wheel centers may be formed at least in part, by fibrous material laid on an annular core, the continuation of the fibrous material from the axle extending over inner and outer annular faces of both wheel centers.

The axle core may be a tube having bearing support end sections bonded thereto. The tube may be of metal, the end sections being welded or suitably bonded to the tube.

The fibrous material may comprise any one of the following fibers or any suitable combination thereof:- carbon, glass, boron and asbestos fibers. However the preferred fibers are carbon and/or glass.

The invention also provides a wheel having a wheel center comprising an annular core having laid thereon carbon and/or glass fibers or any other suitable combination of the fibers referred to above.

Figure 2:
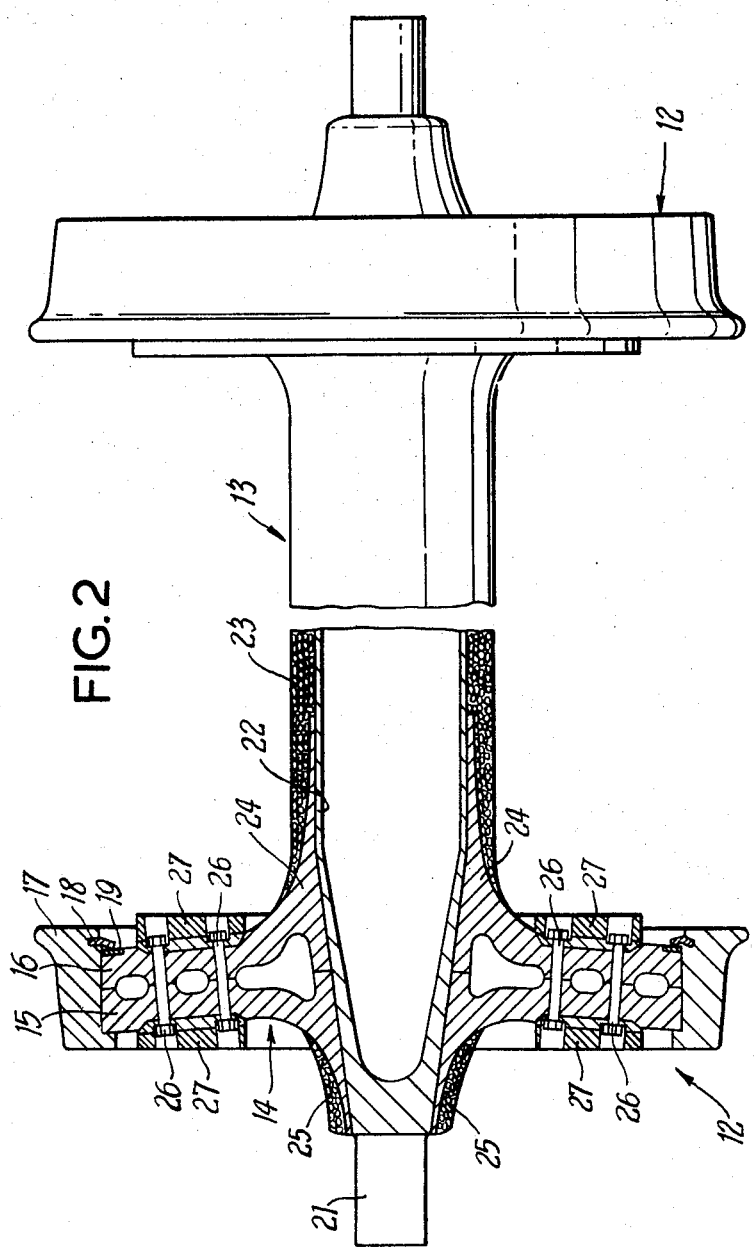

Two embodiments of the present invention will now be described by way of example with reference to the accompanying drawings in which:

FIG. 1 shows a part sectional view of a wheelset in which fibers extend unidirectionally along the longitudinal axis of the axle and FIG. 2 shows a part sectional view of a wheelset in which fibers are wound helically round the axle.

Referring to FIG. 1 the wheelset comprises wheels 1 and axle 2, to which the wheels 1 are fixedly connected.

The axle 2 is initially built up by laying on a resin wetted or pre-impregnated tape or woven fabric 3 or by filament winding resin wetted or pre-impregnated fibers 3 on to a steel core 4 so that the fibers extend helically around the steel core 4. The steel core 4 is formed by welding or suitably bonding pre-machined journal bearing sections 5 to the ends of a steel tube 6. The angle of winding can be varied to suit particular stresses and to build up a required fiber pattern. For example if stiffness is of prime importance the angle of the helix should be as steep as possible, i.e. approaching parallelism with the longitudinal axis of the axle.

Each wheel center 7 is initially built up by laying, for example by winding, either resin wetted filamentary fibers or woven fabric 8 onto an annular core 9, made of plastics foam or other suitable lightweight rigid material, for example timber. Where necessary, additional fibers of short lengths, for example bundles of woven fabric are laid on by draping over the wheel center core 9 to compensate for loss in reinforcement density caused by the radial effect of the winding and to ensure an even distribution of the reinforcement.

When there is a sufficient thickness of reinforcement on the axle core 4 and wheel center cores 9 the axle and wheel center portions thus formed are assembled and bonded together.

The desired total axle wall thickness necessary to withstand the applied forces is obtained by applying additional fiber reinforcement 10 either in the form of resin wetted or preimpregnated filamentary fibers woven fabric or tape. This reinforcement is laid on the portion of the axle 2 between the wheel centers 7 and is continued over the inner face of each wheel center 7 then across the circumferential edge to form a rim for the tire 11 and then over the outer face of the wheel center 7 to the axle, where it is blended into the surface. Both wheels 1 and the axle 2 are thus formed into an integral assembly. The fibers providing the additional reinforcement 10 are preferably laid unidirectionally, parallel to the longitudinal axis of the axle 2 to obtain maximum utilization of the fiber properties.

The orientation of the fibers on the cores 4 and 9 will be chosen to suit the particular stresses to which the wheelset will be subjected. For example in order to withstand compression forces applied to the wheel centers 7 it may be necessary to use woven fabric or to wind fibers chordwise across the annular faces of the wheel center cores 9.

The fibers may be either carbon fibers or glass fibers or a combination of carbon and glass fibers or any other combinations so described previously. An economical combination would be such that, in areas where the stresses are low, e.g. immediately adjacent to the cores of the wheel centers and axle, glass fibers or equivalent fibers are to be used, but in other areas of high tensile stress, e.g. the axle and the transition between axle and wheel center, carbon fibers or any other suitable high strength and high modulus fibers are used. The proportion of glass and carbon reinforcement would be determined according to the stresses in each design of wheelset, with due regard to the input forces which would vary according to the suspension parameters of the particular class of vehicle.

A typical long pot life epoxide resin formulation for prewetting of the fibers is:

Shell 828 resin (100 parts) and Epikure NMA (90 parts + BDMA 2.5 parts): this system remains liquid at room temperature and has to be heated.

The tire 11 is bonded to the wheel center 7 and secured by a retaining ring 12 which bears onto a thin steel ring 13 bonded to the inner face of the wheel center 7.

The advantages to be gained with the use of a composite wheelset described above are as follows:

1. Reduction in unsprung weight and reduction in bogie weight in general.
2. Elimination of residual stresses which are present in existing wheelsets.
3. Elimination of axle/wheel joint.
4. Resulting from 3., elimination of fretting which occurs in existing steel wheelsets and which is a cause of axle fatigue fractures.
5. Resulting from (3), a considerable reduction in the stress concentration in the axle at the axle/wheel transition, which will also reduce the possibility of fatigue failures which occur in existing wheelsets due to high stress concentration.

Referring to FIG. 2 the wheelset shown comprises wheels 12 and axle 13. The wheel centers 14 are formed by bonding coaxially together two sections 15 and 16 produced by pressure molding using resin pre-impregnated carbon fibers and/or resin pre-impregnated glass fibers or other suitable pre-impregnated fibers. An axle of the pre-impregnated system is, by weight, Epikote resin No. 828, 100 parts; Epikure DDM, 7 parts; Epikure $BF_3$ 400, 3 parts, in acetone. Bolts 26 for securing braking discs 27 to the wheel centers would also act as reinforcement of the bonded joint between the two sections 15 and 16. A tire 17 is bonded to each of the wheel centers 14 and is secured by a retaining ring 18 which bears on to a thin steel ring 19 bonded to the inner annular face of the wheel center. To provide a degree of resilience and also to facilitate removal of the tire, an elastomeric layer (not shown) may be provided between the wheel center and the tire. The two sections 15 and 16 of the wheel centers 14 are bonded to an axle core 20.

The axle core 20 is formed by butt welding or suitably bonding pre-machined steel journal sections 21 to the ends of a thin wall steel tube 22. The desired axle wall thickness necessary to withstand service forces is obtained by applying resin impregnated carbon fiber and/or glass fiber reinforcement or other suitable fiber reinforcement 23, either in the form of filament winding, woven fabric, tape or sheet. This reinforcement is applied to the portion of the axle core between the two wheel centers and is continued over the tapered sleeve portions 24 of the wheel center to form an integral assembly having a curved transition profile. A similar application of fiber is applied to the outer sleeve portion 25 of the wheel centers. The fibers in both sections are aligned such that maximum advantage is made of the properties of the fibers. A typical resin formulation such as Epikote 828 resin 100 parts; Epikure $BF_3$400 3 parts, or a polyester resin system such as Crystic 199 can be used.

We claim:

1. A wheelset comprising in combination
   a. a pair of tires,
   b. an axle,
   c. wheel centers disposed between the exterior of the ends of said axle and said tires,
   d. a fibrous resin bonded material would around the portion of the axle which is intermediate said wheels and extending outwardly around at least a portion of each wheel center whereby said axle and said wheel centers are secured together as an integral assembly by said fibrous resin bonded material.

2. A wheelset as set forth in claim 1 in which the wheel centers each have at least one laterally projecting sleeve portion, the continuation of the fibrous resin bonded material extending over said sleeve portions to form the integral assembly.

3. A wheelset as set forth in claim 1 in which each wheel center comprises two substantially annular sections secured coaxially together.

4. A wheelset as set forth in claim 3 in which each section has a laterally projecting sleeve portion, the fibrous resin bonded material being secured around both the sleeve portions of each section.

5. A wheelset as claimed in claim 1 in which the wheel centers are formed at least in part by fibrous material laid on an annular core, the continuation of the fibrous resin bonded material from the axle extending over both the inner and outer annular faces of both wheel centers.

6. A wheelset as set forth in claim 1 in which the axle core comprises a tube having bearing support end sections bonded thereto.

7. A wheelset as set forth in claim 6 in which the tube is of metal, the end sections being welded to the tube.

8. A wheelset as set forth in claim 1 in which the fibrous resin bonded material comprises at least one material selected from the group consisting of carbon and boron fibers in combination with at least one material selected from the group consisting of glass and asbestos fibers.

* * * * *